United States Patent
Babovic

(10) Patent No.: US 7,209,743 B2
(45) Date of Patent: Apr. 24, 2007

(54) BASE STATION SYSTEM AND METHOD FOR COMPENSATING TRAFFIC CHANNEL SIGNAL STRENGTH MEASUREMENTS IN A CELLULAR RADIO TELECOMMUNICATION NETWORK

(75) Inventor: Marko Babovic, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 148 days.

(21) Appl. No.: 10/830,246

(22) Filed: Apr. 22, 2004

(65) Prior Publication Data
US 2005/0239471 A1 Oct. 27, 2005

(51) Int. Cl.
*H04Q 7/20* (2006.01)

(52) U.S. Cl. ............... 455/436; 455/437; 455/438; 455/439

(58) Field of Classification Search ............ 455/452.2, 455/436–445; 370/329–335
See application file for complete search history.

(56) References Cited

U.S. PATENT DOCUMENTS

| | | | |
|---|---|---|---|
| 5,995,836 A | 11/1999 | Wijk et al. | |
| 6,285,883 B1 | 9/2001 | Bringby et al. | |
| 6,295,452 B1* | 9/2001 | Choi | 455/436 |
| 6,917,808 B1* | 7/2005 | Nelson | 455/436 |
| 2003/0137953 A1* | 7/2003 | Chae et al. | 370/331 |

FOREIGN PATENT DOCUMENTS

| | | |
|---|---|---|
| WO | WO98/30043 A2 | 7/1998 |
| WO | WO03/105520 A1 | 12/2003 |

* cited by examiner

*Primary Examiner*—Joseph Feild
*Assistant Examiner*—Kwasi Karikari

(57) ABSTRACT

A Base Station System (BSS) and method for compensating traffic channel signal strength measurements to provide improved handover decisions. Each active mobile station in a given cell is instructed to measure and report signal strengths of the mobile station's active traffic channel, broadcast channels from neighboring cells, and a broadcast channel from the given cell over a predefined period of time. An offset value calculator analyzes the signal strength measurements of the active traffic channel and the given cell's broadcast channel, and calculates an updated value for a compensation offset factor. The updated value is then used within a handover algorithm to determine when to hand over mobile stations during future connections on the active traffic channel.

18 Claims, 3 Drawing Sheets

BASE STATION SYSTEM AND METHOD FOR COMPENSATING TRAFFIC CHANNEL SIGNAL STRENGTH MEASUREMENTS IN A CELLULAR RADIO TELECOMMUNICATION NETWORK

BACKGROUND OF THE INVENTION

The present invention relates to radio telecommunication networks. More particularly, and not by way of limitation, the present invention is directed to a Base Station System (BSS) and method for compensating traffic channel signal strength measurements for improved handover decisions in a cellular radio telecommunication network.

In cellular telecommunication networks operated in accordance with the Global System for Mobile Communications (GSM) standard, mobile stations measure and report the signal strengths of the currently serving cell and neighboring cells. The neighboring cells are identified in a neighbor cell list broadcast by the serving BSS. When a particular mobile station is engaged in an ongoing circuit-switched call, the mobile station measures the signal strength of the active traffic channel being used for the call, and measures the signal strengths of the neighboring cells' broadcast channels. These measurements are reported to the serving BSS in measurement reports. As the mobile station approaches the border of the serving cell, a decision is made as to whether to handover the mobile station to a neighboring cell by comparing the signal strength of the active traffic channel with the reported signal strengths of the neighboring cells' broadcast channels.

For network planning purposes, the cell border between two cells is defined as the locations where the signal strengths of the broadcast channels (BCCHs) from the two cells are equal, as adjusted by different offsets and hysteresis values. If the radio propagation characteristics of certain traffic channels in a cell significantly differ from the radio propagation characteristics of the BCCH of the same cell, inaccuracy is introduced because the cell border cannot be kept at the same location for incoming and outgoing handovers. This may cause a variety of unwanted effects and network performance degradation. For example, a mismatched border may cause premature or delayed handovers, ping-pong effects (mobile stations being repeatedly handed over back and forth between two cells), lower quality connections, and increased dropped calls.

A conventional solution for minimizing the unwanted effects and network performance degradation is to compensate for the difference in the radio propagation characteristics between traffic channels and the BCCH with a unique offset value that is added to or subtracted from the reported signal strength of the active traffic channel. However, the only accurate way to currently determine the value of the offset is through a trial-and-error tuning process. In this process, an optimizer estimates an appropriate compensation offset value by calculating the pathloss differences that apply to the signal passing through different cables, antennas, and the like, and finally transmitting on different frequencies. This value is applied to the traffic channel, and then statistics are gathered to determine the effectiveness of the compensation offset value. If the value was not correct (which is very likely), a new value is chosen, and statistics are again gathered to determine the offset's effectiveness. This is a time-consuming and error-prone method. Each cell's offset must be tuned to the cell's radio propagation differences between channels. However, the radio propagation characteristics vary between different cells and environments, thus making it difficult to determine an accurate offset value.

BRIEF SUMMARY OF THE INVENTION

In one aspect, the present invention is directed to a method of compensating traffic channel signal strength measurements for improved handover decisions in a cellular radio telecommunication network. The method includes the steps of receiving by a serving base station, signal strength measurements taken periodically by a served mobile station for a predefined period of time. The measurements include signal strength measurements of the mobile station's active traffic channel, broadcast channels from neighboring cells, and a broadcast channel from the mobile station's serving base station. The collected signal strength measurements of the active traffic channel and the serving base station broadcast channel are then analyzed to determine a compensation offset value. This is followed by adding or subtracting the compensation offset value to the signal strength of the active traffic channel to achieve a compensated signal strength of the active traffic channel that is approximately equal to the signal strength of the serving base station broadcast channel; and utilizing the compensated signal strength of the active traffic channel in a handover algorithm to determine when to hand over the mobile station to a neighboring cell.

In another aspect, the present invention is directed to a base station that compensates traffic channel signal strength measurements to provide improved handover decisions. The base station includes a receiver that receives signal strength measurements taken periodically by a served mobile station. The measurements include signal strength measurements of the mobile station's active traffic channel, broadcast channels from neighboring cells, and a broadcast channel from the mobile station's serving base station. A measurement database collects the signal strength measurements from the receiver over a predefined period of time, and stores the measurements. The base station also includes an offset value calculator that retrieves the stored measurements from the database, analyzes the signal strength measurements of the active traffic channel and the serving base station broadcast channel, and calculates a compensation offset value. A handover algorithm then adds or subtracts the compensation offset value to the signal strength of the active traffic channel to achieve a compensated signal strength of the active traffic channel that is approximately equal to the signal strength of the serving base station broadcast channel. The algorithm utilizes the compensated signal strength of the active traffic channel to determine when to hand over the mobile station to a neighboring cell.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION OF THE INVENTION

The present invention employs a self-learning algorithm to calculate and apply a unique compensation offset to traffic channels that have radio propagation characteristics significantly different from the radio propagation characteristics of the same cell's broadcast channel. As a result, the cell border can be kept at the same location for both incoming and outgoing handovers, and the unwanted effects and network performance degradation referred to above can be minimized or eliminated.

Figure 1:
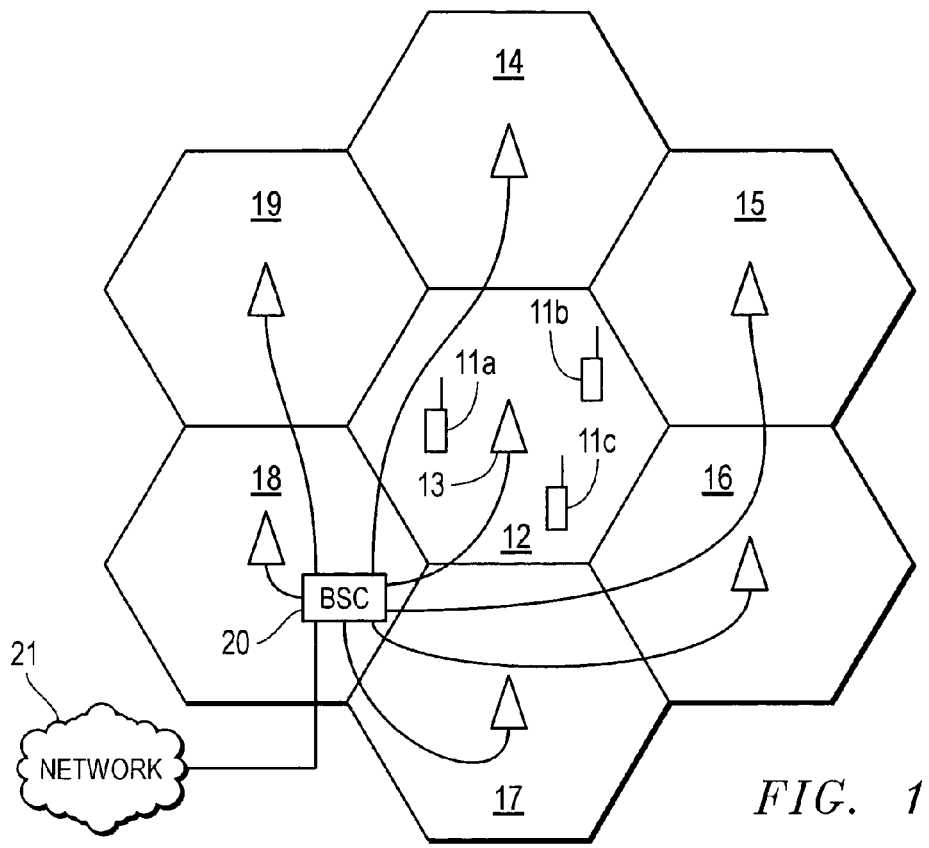
FIG. 1 is a simplified block diagram of a portion of a cellular telecommunication network suitable for implementing the present invention.

FIG. 1 is a simplified block diagram of a portion of an exemplary cellular telecommunication network suitable for implementing the present invention. A plurality of Mobile Stations (MSs) 11a–11c are operating within a serving cell 12 being generated by a serving Base Transceiver Station (BTS) 13. The serving cell is surrounded by neighboring cells 14–19, each of which is generated by its own BTS. Each of the BTSs is connected by a suitable communication link to one or more Base Station Controllers (BSCs) 20. The BSCs together with the BTSs are referred to as a Base Station System (BSS). The BSC, in turn, is connected to the rest of the cellular network 21, as is known to those skilled in the art.

Figure 2:
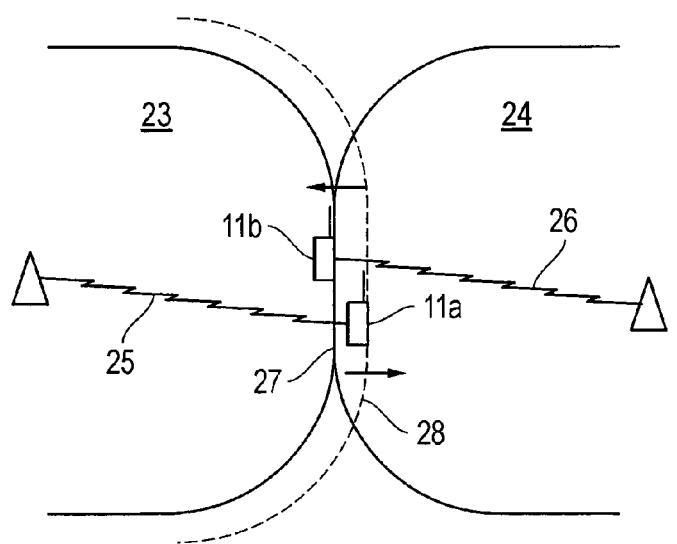
FIG. 2 is an illustrative drawing of a cell border showing the problem created when the radio propagation characteristics of a traffic channel in a cell significantly differs from the radio propagation characteristics of the broadcast channel of the same cell.

FIG. 2 is an illustrative drawing of a cell border showing the problem created when the radio propagation characteristics of a traffic channel in a cell significantly differs from the radio propagation characteristics of the broadcast channel of the same cell. A first cell 23 borders a second cell 24. An MS 11a is engaged in an ongoing call on a traffic channel 25 in the first cell. An MS 11b is engaged in an ongoing call on a traffic channel 26 in the second cell. The solid line 27 illustrates the planned cell border based upon the locations at which the signal strengths of the BCCHs from each cell are equal. In the illustrated example, the radio propagation characteristics of the traffic channel 25 create a signal strength at MS 11a that is higher than the signal strength of the BCCH in the first cell 23. Therefore, MS 11a is not analyzed for handover to the second cell 24 until it reaches the dotted line 28. Meanwhile, in the second cell, the radio propagation characteristics of the traffic channel 26 create a signal strength at MS 11b that is approximately equal to the signal strength of the BCCH in the second cell. Therefore, MS 11b is analyzed for handover to the first cell 23 when it reaches the planned cell border 27. Thus, for the two cells, the cell border is at different locations for incoming and outgoing handovers.

Figure 3:
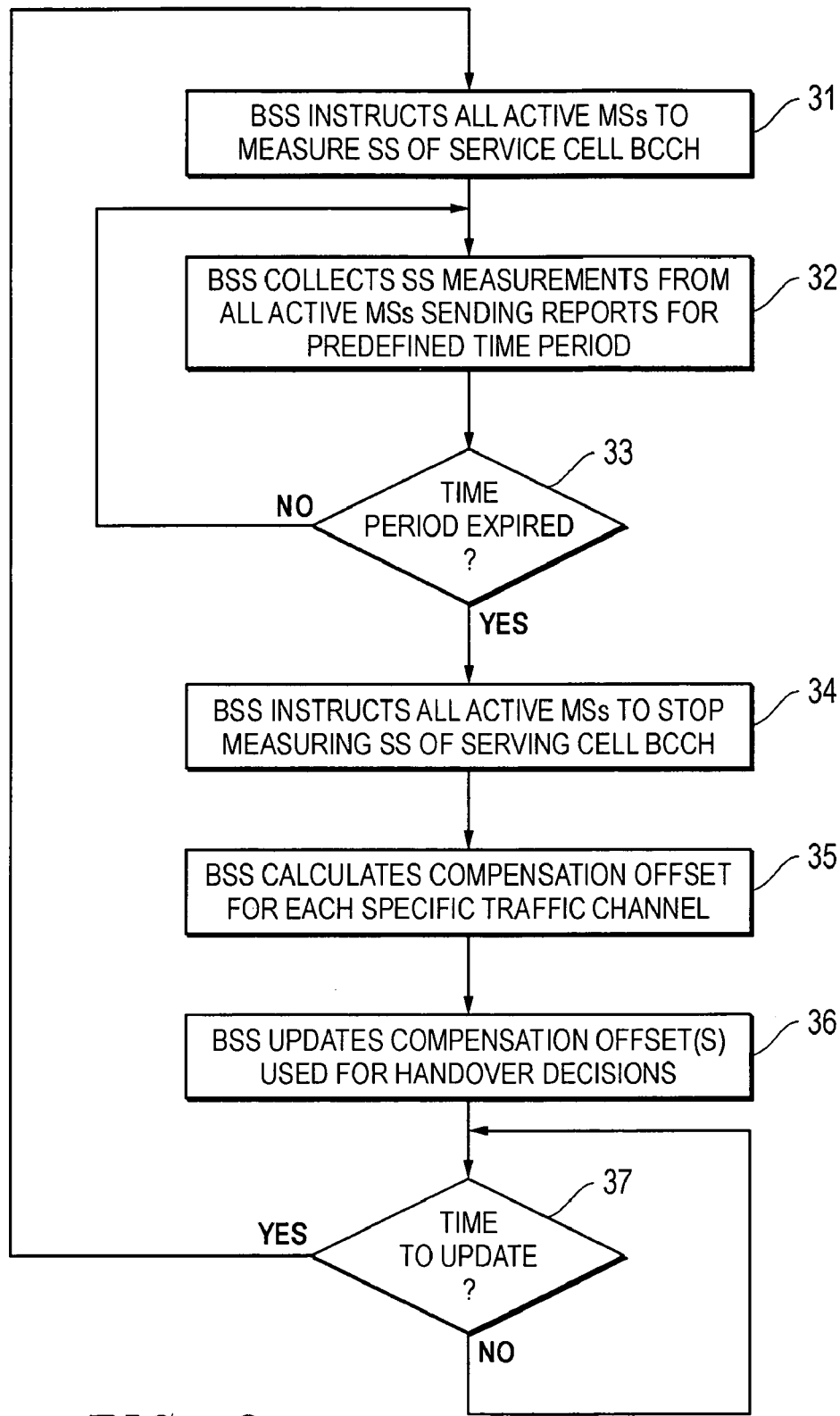
FIG. 3 is a flow chart illustrating the steps of an exemplary embodiment of the method of the present invention.

FIG. 3 is a flow chart illustrating the steps of an exemplary embodiment of the method of the present invention. Referring to FIGS. 1 and 3, the method begins at step 31 where the BSS 13 instructs all active MSs such as MS 11a to measure the signal strength of the BCCH of the serving cell 12. In one embodiment, this instruction is accomplished by adding the frequency of the BCCH to the MS's neighbor cell list (Active BA-list). This causes each of the MSs to send to the BSS, the signal strength measurements of the active traffic channel, neighboring BCCHs, and the serving cell BCCH. At step 32, the BSS collects, for a predefined time period, the signal strength measurements from all active MSs sending measurement reports in the serving cell. Collection of the signal strength measurements continues until the predefined time period expires at step 34. The predefined time period may be, for example, a few hours, a day, or a few days. Thereafter, in step 34, the BSS instructs all active MSs to stop measuring the signal strength of the serving cell BCCH. The collection of measurements is then complete.

At step 35, the BSS 13 analyzes the collected measurements from all the active MSs in the cell 12, and calculates a unique compensation offset that is optimal for each specific traffic channel in the given cell. The offset represents the difference in radio propagation characteristics between each specific traffic channel and the serving cell's BCCH based on live traffic. As an example, the optimal compensation value may be a linear function of the mean value of all the signal strength differences from all collected measurement reports from all active MSs served by a specific traffic channel. At step 36, the BSS 13 updates the compensation offset(s) being used in handover decisions. The new offset value is then used to compensate for the signal strength differences for all future traffic in order to make handover decisions.

The compensation offset value may be updated periodically (i.e., upon expiration of an update timer) or upon request of the system operator so that changing radio propagation characteristics are properly accounted for. For example, the compensation offset value may be updated on a monthly basis. At step 37, it is determined whether it is time to update the compensation offset value. If not, the method continues to wait for either the update timer to expire or for the system operator to request an update. If it is time to update the compensation offset value, the method returns to step 31 where the method is repeated to calculate a new compensation offset value.

Figure 4:
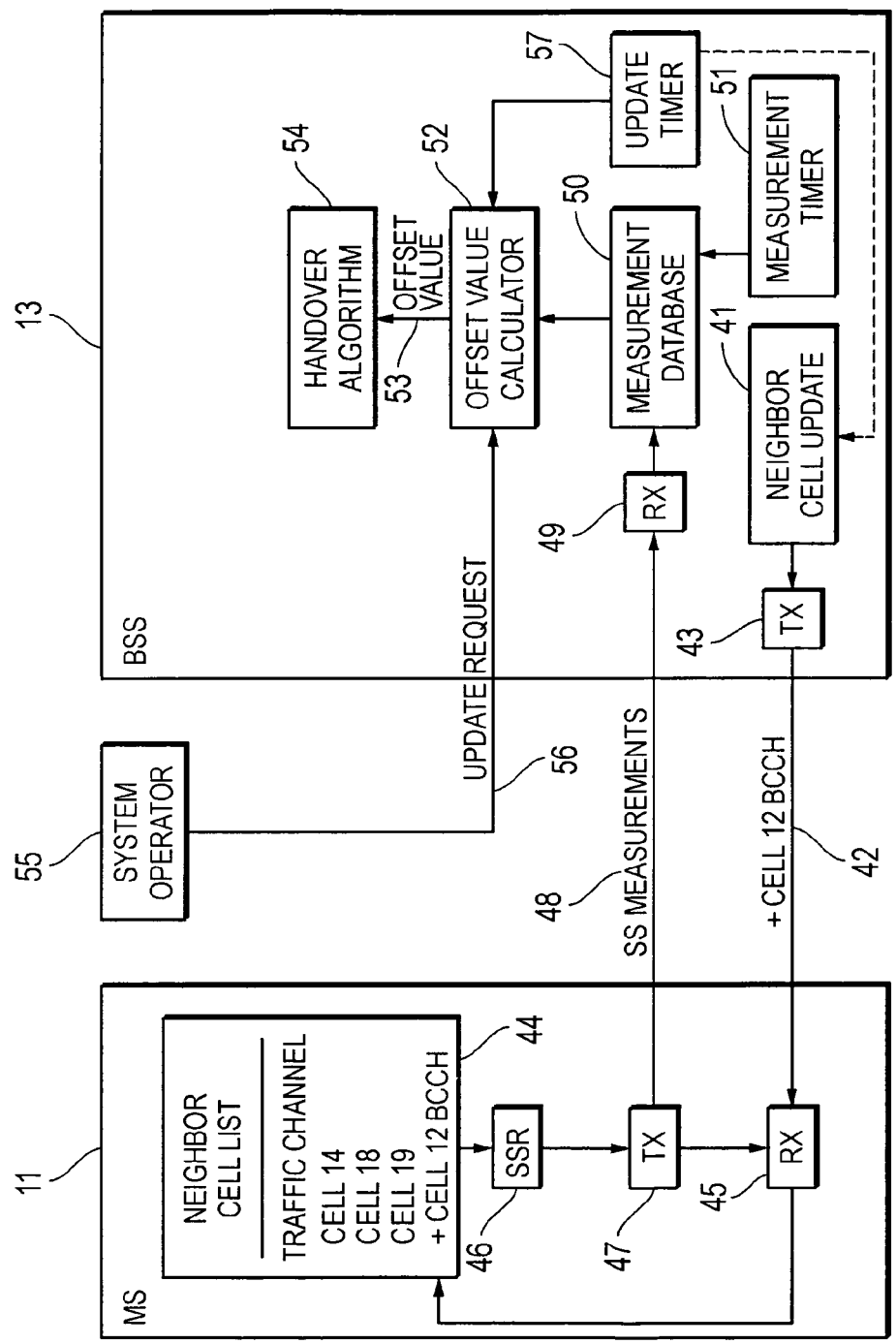
FIG. 4 is a simplified block diagram of an MS and BSS modified in accordance with the system of the present invention.

FIG. 4 is a simplified block diagram of an MS 11 and BSS modified in accordance with the system of the present invention. The BSS instructs the MS to measure the signal strength of the BCCH of the serving cell. In the illustrated embodiment, a neighbor cell update unit 41 in the BSS sends an updated BA-list 42 through a transmitter 43 to the MS, adding the frequency of the BCCH to the MS's neighbor cell list 44. The updated BA-list is received by a receiver (RX) 45, and the serving cell BCCH is included in the neighbor cell list 44 in the MS. A signal strength receiver (SSR) 46 measures the signal strengths of the channels in the neighbor cell list 44, and a transmitter (TX) 47 sends to the BSS, the signal strength measurements 48 of the active traffic channel, neighboring BCCHs, and the serving cell BCCH. The MS may continue to send the signal strength measurements as long as the MS is in the active mode served by the specific cell.

The BSS receives the signal strength measurements through a receiver 49 and collects the measurements in a measurement database 50 for a predefined time period measured by a measurement timer 51. When the measurement timer expires, an offset value calculator 52 analyzes the collected measurements and calculates a unique compensation offset value that is optimal for the specific traffic channel of the MS. The offset represents the difference in radio propagation characteristics between the MS's specific traffic channel and the serving cell's BCCH based on live traffic. The calculated compensation offset value 53 is sent to a handover algorithm 54 where the offset is updated with the new value. The new offset value is then used to compensate for the signal strength differences for all future traffic in order to make handover decisions.

As noted above, the compensation offset value may be updated periodically or upon request of a system operator 55 so that changing radio propagation characteristics are properly accounted for. If the value is updated upon request of the system operator, an update request 56 may be sent to the offset value calculator 52. If the value is updated periodically, it may be updated upon the expiration of an update timer 57.

With this solution, the tuning of the compensation offset value for the radio propagation differences between different channels within each cell is made automatically (periodically) or semi-automatically (on request). The cell border in the cells with significant difference in radio propagation on different channels is kept unique and more aligned to the BCCH's signal strength. Following a handover to a neighboring cell, the new serving base station may update the mobile station's neighbor cell list as required. For example, the mobile station would normally stop measuring the signal strength of the neighboring cell's BCCH when the neighboring cell becomes the new serving cell. With the present invention, the mobile station may be instructed to include this new serving cell's BCCH on the neighbor cell list after the handover. This would depend in general on the operator's choice for the cells to be included in this algorithm.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of compensating traffic channel signal strength measurements for improved handover decisions in a cellular radio telecommunication network, said method comprising the steps of:
    collecting by a Base Station System (BSS), signal strength measurements taken by a plurality of active mobile stations operating within a given cell, said measurements including signal strength measurements of the mobile stations' active traffic channels, broadcast channels from neighboring cells, and a broadcast channel from the given cell;
    instructing the mobile stations to stop measuring the signal strength of the broadcast channel from the given cell when a predefined event occurs;
    analyzing by the BSS, the collected signal strength measurements from the active mobile stations to determine for the given cell, a unique compensation offset factor for each traffic channel, wherein the unique compensation offset factor for a given traffic channel is based on a mean value of all the signal strength differences between the given traffic channel and the broadcast channel of the given cell, as collected from a plurality of mobile stations served by the given traffic channel; and
    making future handover decisions for mobile stations served by the given traffic channel by utilizing the unique compensation offset factor for the given traffic channel to define a cell border between the given cell and a neighboring cell.

2. The method of claim 1, further comprising, prior to collecting the signal strength measurements, the step of instructing all of the active mobile stations in the given cell to measure the signal strength of the given cell's broadcast channel.

3. The method of claim 2, wherein the step of instructing all of the active mobile stations to measure the signal strength of the given cell's broadcast channel includes instructing all of the active mobile stations to add the given cell's broadcast channel to each mobile station's neighbor cell list.

4. The method of claim 2, wherein the step of instructing all of the active mobile stations to measure the signal strength of the given cell's broadcast channel includes instructing all of the active mobile stations to measure and report to the BSS, the signal strength of the given cell's broadcast channel for a predefined time period.

5. The method of claim 2, wherein the step of instructing all of the active mobile stations to measure the signal strength of the given cell's broadcast channel includes instructing all of the active mobile stations to measure and report to the BSS, the signal strength of the given cell's broadcast channel until the mobile stations are instructed otherwise.

6. The method of claim 1, further comprising the steps of:
    determining whether the unique compensation offset for a given traffic channel should be updated; and
    if the unique compensation offset for the given traffic channel should be updated, determining an updated unique compensation offset factor by analyzing the signal strength measurements of the active traffic channel and the given cell's broadcast channel collected over a new predefined time period from the plurality of mobile stations served by the given traffic channel.

7. The method of claim 6, wherein the step of determining whether the unique compensation offset should be updated includes receiving a request from a system operator to update the unique compensation offset for the given traffic channel.

8. The method of claim 6, wherein the step of determining whether the unique compensation offset should be updated includes determining whether an update timer has expired.

9. The method of claim 1, further comprising the steps of:
    handing over a given mobile station to the neighboring cell; and
    instructing the given mobile station to measure and report the signal strength of the broadcast channel from the neighboring cell, wherein the neighboring cell is the given mobile station's new serving cell.

10. The method of claim 1, wherein the step of analyzing the collected signal strength measurements from the active mobile stations to determine a unique compensation offset factor includes:
    calculating the unique compensation offset factor utilizing a linear function of the mean value of all the signal strength differences between the given traffic channel and the broadcast channel of the given cell, as collected from the plurality of mobile stations served by the given traffic channel.

11. In a cellular radio telecommunication network, a Base Station System (BSS) that compensates traffic channel signal strength measurements to provide improved handover decisions, said BSS comprising:
    a receiver that receives signal strength measurements taken by all active mobile stations operating within a given cell, said measurements including signal strength measurements of the mobile stations' active traffic channels, broadcast channels from neighboring cells, and a broadcast channel from the given cell;
    a transmitter for instructing the mobile stations to stop measuring the signal strength of the broadcast channel from the given cell when a predefined event occurs;
    a measurement database that collects the signal strength measurements from the receiver;
    an offset value calculator that retrieves the measurements from the database, analyzes the signal strength measurements of the active traffic channels and the broadcast channel of the given cell, and calculates for the given cell, a unique compensation offset factor for each traffic channel, wherein the unique compensation offset factor for a given traffic channel is based on a mean value of all the signal strength differences between the given traffic channel and the broadcast channel of the given cell, as collected from a plurality of mobile stations served by the given traffic channel; and a handover algorithm for making future handover decisions for the mobile stations served by the given traffic channel by utilizing the unique compensation offset factor for the given traffic channel to define a cell border between the given cell and a neighboring cell.

12. The BSS of claim 11, further comprising means for instructing all of the active mobile stations to measure the signal strength of the given cell's broadcast channel.

13. The BSS of claim 12, wherein the means for instructing all of the active mobile stations to measure the signal strength of the given cell's broadcast channel includes means for instructing all of the active mobile stations to add the given cell's broadcast channel to each mobile station's neighbor cell list.

14. The BSS of claim 12, wherein the means for instructing all of the active mobile stations to measure the signal strength of the given cell's broadcast channel includes means for instructing all of the active mobile stations to measure the signal strength of the given cell's broadcast channel until instructed otherwise.

15. The BSS of claim 12, wherein the means for instructing all of the active mobile stations to measure the signal strength of the given cell's broadcast channel includes means for instructing all of the active mobile stations to measure and report to the BSS, the signal strength of the given cell's broadcast channel for a predefined time period.

16. The BSS of claim 15, further comprising means for determining whether the unique compensation offset for a given traffic channel should be updated, wherein the offset value calculator, in response to a determination that the unique compensation offset for the given traffic channel should be updated, calculates an updated unique compensation offset factor by analyzing the signal strength measurements of the active traffic channel and the given cell's broadcast channel collected over a new predefined time period from the plurality of mobile stations served by the given traffic channel.

17. The BSS of claim 16, wherein the means for determining whether the unique compensation offset value for the given traffic channel should be updated includes an update timer.

18. The BSS of claim 11, wherein the offset value calculator calculates the unique compensation offset factor utilizing a linear function of the mean value of all the signal strength differences between the given traffic channel and the broadcast channel of the given cell, as collected from the plurality of mobile stations served by the given traffic channel.

* * * * *